United States Patent [19]

Maeda et al.

[11] Patent Number: 4,717,331

[45] Date of Patent: Jan. 5, 1988

[54] SPINNING NOZZLE

[75] Inventors: Naoyuki Maeda, Tokyo; Osamu Kato; Hirosaku Oshimi, both of Yokohama; Akira Nii, Kawasaki; Hiroshi Shimada; Michiharu Harakawa, both of Yokohama; Takuji Hirano; Shigeo Hara, both of Hiratsuka, all of Japan

[73] Assignee: Nippon Oil Company Limited, Tokyo, Japan

[21] Appl. No.: 739,155

[22] Filed: May 30, 1985

[30] Foreign Application Priority Data

Jun. 1, 1984 [JP] Japan .................................. 59-111013

[51] Int. Cl.$^4$ .............................................. B29C 47/12
[52] U.S. Cl. ..................... 425/467; 264/29.2; 423/447.2; 425/463; 425/464; 425/382.2
[58] Field of Search ............ 425/466, 467, 468, 382.2, 425/463, 464; 264/29.2, 108; 423/447.2

[56] References Cited

U.S. PATENT DOCUMENTS

| 2,131,810 | 10/1938 | Kinsella et al. | 264/207 |
| 3,168,509 | 2/1965 | Juel | 264/108 |
| 3,375,548 | 4/1968 | Kido et al. | 425/199 |
| 3,421,181 | 1/1969 | Steuber | 425/199 |
| 3,540,080 | 11/1970 | Goossens | 425/131.5 |
| 3,577,308 | 5/1971 | Van Drunen et al. | 156/324 |
| 3,608,148 | 9/1971 | Sluijters | 425/198 |
| 4,308,004 | 12/1981 | Chion et al. | 425/131.5 |
| 4,316,714 | 2/1982 | Pfeiffer et al. | 425/467 |
| 4,346,053 | 8/1982 | Pfeiffer | 264/561 |
| 4,376,747 | 3/1983 | Nazem | 264/176 F |
| 4,414,276 | 11/1983 | Kiriyama et al. | 264/176 F |
| 4,473,386 | 9/1984 | Strickland | 264/177 F |
| 4,504,454 | 3/1985 | Riggs | 423/447.1 |
| 4,541,982 | 9/1985 | Upmeier | 425/199 |
| 4,576,811 | 3/1986 | Riggs et al. | 423/447.2 |

FOREIGN PATENT DOCUMENTS 2243944 3/1974 Fed. Rep. of Germany ...... 425/199
49-62380 6/1974 Japan .

Primary Examiner—Jan H. Silbaugh
Assistant Examiner—Hubert C. Lorin
Attorney, Agent, or Firm—D. Peter Hochberg

[57] ABSTRACT

A melt-spinning nozzle in which is disposed an elongated molded piece so as to form a space serving as a melt flow path between the elongated molded piece and the inner wall of the nozzle.

7 Claims, 27 Drawing Figures

FIG. 1
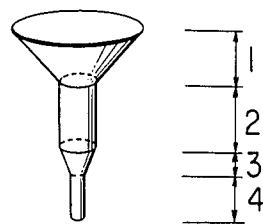
FIG. 2(a)  FIG. 2(b)  FIG.2(c)
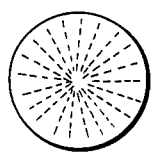 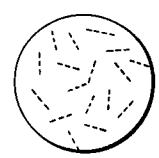 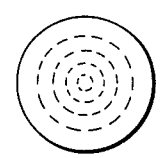
FIG.3(a)  FIG. 3(b)  FIG.3(c)
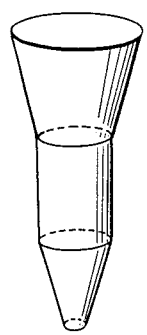 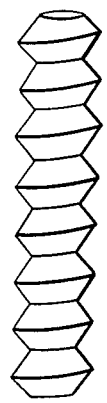 

FIG. 3(d)     FIG. 3(e)     FIG. 3(f)
   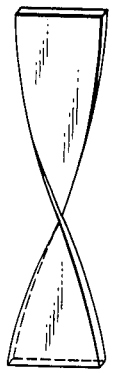   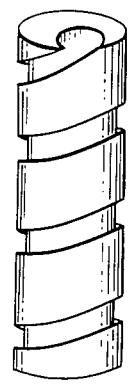
FIG.3(g)   FIG.3(h)  FIG.3(i)  FIG.3(j)
      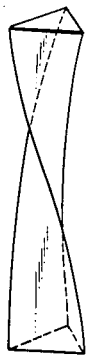   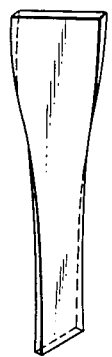

SPINNING NOZZLE

BACKGROUND OF THE INVENTION

The present invention relates to a spinning nozzle and more particularly to a spinning nozzle for controlling the cross-sectional structure of fiber obtained by melt-spinning a polymer which has a plate-like molecular structure.

As an example of the method for producing fiber by spinning an organic polymer, there has heretofore been used a method in which a molten organic polymer or a solution of the polymer in a suitable solvent is extruded through a die having a nozzle of a very small diameter.

In melt-spinning a polymer, especially a straight-chain polymer, the orientation in the direction of fiber axis has been considered to be an important factor which governs fiber characteristics. However, with regard to a polymer which has a plate-like molecular structure, it has become clear that with only control of the orientation in the direction of fiber axis, it is insufficient and that the orientation in the direction perpendicular to the fiber axis, namely in a cross-sectional direction of fiber, is also an important factor in determining fiber characteristics.

A conventional melt-spinning nozzle generally comprises a countersink 1, counterbore 2, an approach 3 and a capillary 4, as shown in FIG. 1. Its cross section is usually circular. There are also many conventional melt-spinning nozzles whose constituent parts cannot always be distinguished clearly, for example a counter-sink and a counterbore or an approach are integrated with each other.

However, even if a polymer having a plate-like molecular structure is melt-spun using such a conventional melt-spinning nozzle, it is very difficult to obtain a spun yarn of high performance. This will be explained below with respect to the case where a mesophase pitch is used as such polymer having a plate-like molecular structure.

If a mesophase pitch is melt-spun using a conventional melt-spinning nozzle, the resultant pitch fiber is apt to have a "radial structure" as shown in FIG. 2(a). Pitch fiber having such radial structure is apt to crack in the radial direction, and even if yarn cracking does not occur in the stage of pitch fiber, it will occur upon subsequent calcination (infusibilization or carbonization) into carbon fiber, thus making it impossible to develop a sufficient strength, and so its use as product becomes impossible. Therefore, at the stage of spinning a mesophase pitch which is apt to take such radial structure into pitch fiber, its cross-sectional structure should be controlled into such a "random structure" or "onion-like (or tangential) structure" as shown in FIG. 2(b) or 2(c) or into a structure which is basically a radial structure but is difficult to undergo yarn cracking. Whether such control can be made or not is very important in producing a high strength carbon fiber from mesophase pitch.

There are few examples of reports on this problem. In U.S. Pat. No. 4,376,747 there is disclosed a method in which a porous body of metal or ceramic material is formed into a portion of spinnaret in the interior of a die. An example of roughening the inner wall of a capillary is also disclosed therein. However, in performing on an industrial scale a multinozzle spinning in which a plurality of filaments are spun simultaneously from a single die, it is very difficult with the above method to have uniform the pressure drop in each nozzle, thus resulting in non-uniform volume of filaments extruded from the nozzles and so making it impossible to obtain a stable yarn of a uniform diameter.

SUMMARY OF THE INVENTION

It is the object of the present invention to provide a melt-spinning nozzle capable of controlling a cross-sectional orientation of fiber effectively without exhibiting the above-mentioned drawbacks.

The present invention resides in a melt-spinning nozzle within which is disposed an elongated molded piece to form a space serving as a melt flow path between it and the nozzle inner wall. This melt-spinning nozzle is particularly suitable for melt-spinning plate-like molecules of polycyclic aromatics.

BRIEF DESCRIPTION OF THE DRAWINGS

FIG. 1 is a perspective view showing a basic shape of a melt-spinning nozzle;

FIG. 2(a), (b) and (c) are conceptual diagrams of radial structure, random structure and onionlike structure, respectively;

FIG. 3(a) to (n) are perspective views showing examples of elongated molded pieces used in the present invention;

DESCRIPTION OF THE PREFERRED EMBODIMENTS

The melt-spinning nozzle according to the present invention may be such a conventional spinning nozzle as shown in FIG. 1. Usually, a large number of such a shape of nozzle as shown in FIG. 1 are formed in a die plate of predetermined intervals.

A structural characteristic of the present invention resides in that an elongated molded piece is disposed in a spinning direction within each nozzle so as to form a space serving as a melt flow path between it and the nozzle inner wall.

The shape of the elongated molded piece referred to herein is not essentially limited if only its height is larger than its width. Examples are cylinder, semi-cylinder, cone, prism, polygonal cone, ellipse, plate, and any combination thereof. These may have a groove or projection on its side face. A particularly preferred groove is a spiral groove such as a drill- or screw-like groove. It is also preferable that the shaped articles exemplified above have a twist partially or wholly. The material of the elongated molded piece used in the present invention is not specially limited either. It may be a suitable metal.

Preferably, the elongated molded piece is disposed over a length corrresponding to one third or more, more preferably one half or more, of the die plate thickness from the upper surface of a die and not contacting a capillary 4 which is a spinning portion. If its extending depth is less than one third of the die plate thickness, the effect of the present invention cannot be fully expected. Further, it is necessary that a space serving as a melt flow path be formed between the elongated molded piece and at least a part of the nozzle inner wall in any cross section when the molded piece is disposed within the nozzle. The area of this space is not specially limited if only it is not smaller than the cross-sectional area of the capillary.

Figures 3K, 3L, 3M, 3N:
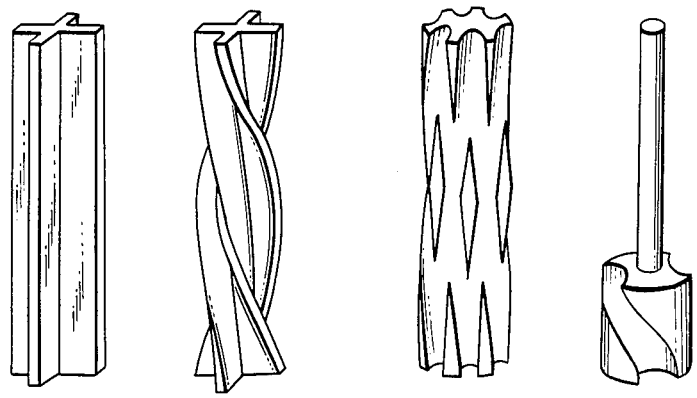

Examples of the elongated molded piece used in the present invention are as shown in FIG. 3.

Figure 4A:
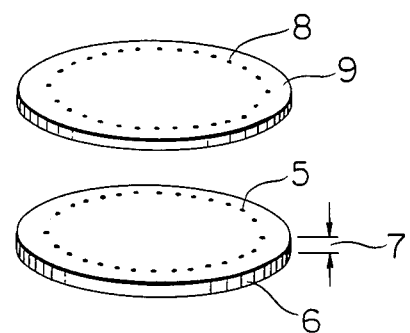
FIG. 4(a) is a perspective view of a die and a fixing plate, and (b) is a sectional view showing a state of use of (a)
Figure 4B:
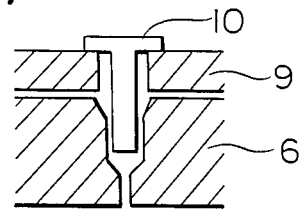

It is desirable that the elongated molded piece be disposed and fixed as uniformly as possible within each nozzle formed in a die. To this end, it is preferable that the molded piece have such a size as to permit its upper end to protrude from the upper surface of the die and that a fixing plate for supporting the upper end of the molded piece be provided. This state is as shown in FIG. 4. In FIG. 4(a), the reference numeral 6 denotes a die having a large number of nozzles 5 (the numeral 7 representing a die plate thickness and the numeral 9 denotes a fixing plate 9 having molded piece fixing holes 8 in positions which come into alignment with the nozzle positions when the fixing plate is put on the nozzle. FIG. 4(b) is a sectional view showing a state in which a molded piece 10 is disposed in the nozzle using the fixing plate 9. A fixing piece is attached to the upper end of the molded piece 10, which is then inserted from the hole 8 of the fixing plate 9 into the nozzle of the die 6. By so doing, the molded piece can be easily disposed perpendicularly in a predetermined position. The fixing plate may be centrally provided with a melt distributor. Alternatively, a melt distributor may be provided separately on the fixing plate.

The spinning nozzle of the present invention can easily afford a pitch fiber having a cross-section of random or onion-like structure from a mesophase pitch, without cracking of not only the pitch fiber but also carbon fiber obtained by calcining the pitch fiber, and thus affording a high strength fiber.

Moreover, the elongated molded piece used in the present invention can be easily fabricated into the same shape and can be disposed uniformly, so when it is applied to a multi-nozzle spinning, the pressure drop in each nozzle can be maintained uniform, thus ensuring a stable spinning of yarn having a uniform diameter on an industrial scale.

The following examples are given to further illustrate the present invention.

COMPARATIVE EXAMPLE

Figure 5A:
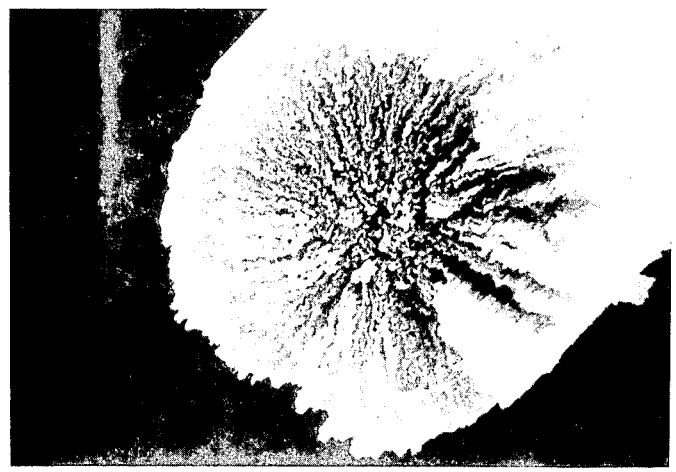
FIGS. 5(a) to (g) are electron micrographs of pitch fiber cross-sections in comparative and working examples.
Figure 5B:
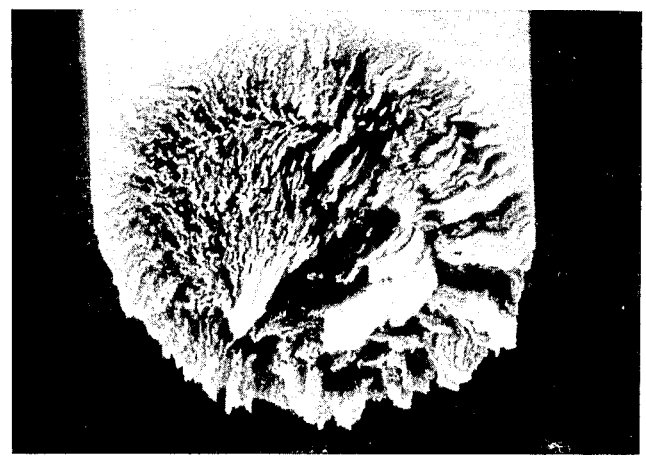
Figure 5C:
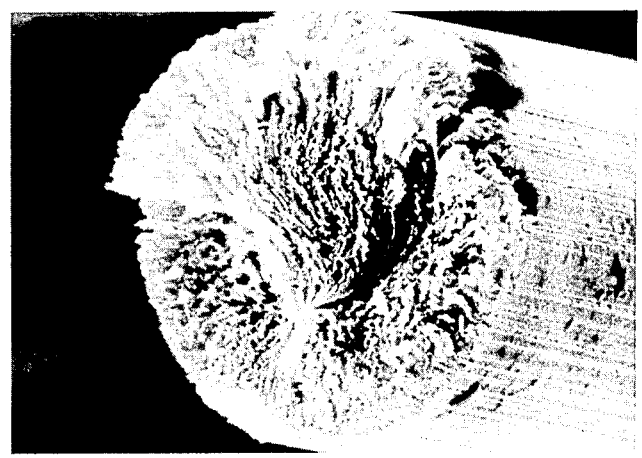
Figure 5D:
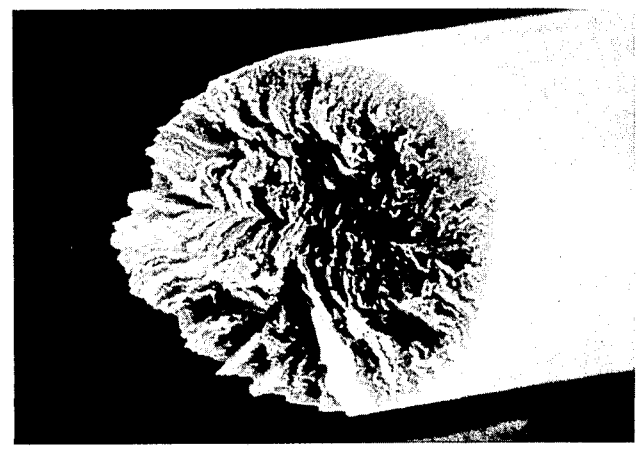
Figure 5E:
Figure 5F:
Figure 5G:
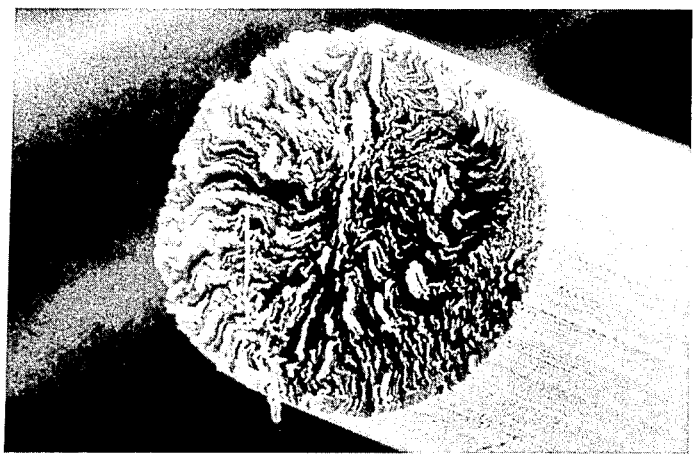

A petroleum pitch having a softening point of 260° C. was melt-spun at 320° C. using a melt-spinning apparatus having a counterbore of 3 mm, a die plate thickness of 7 mm and a capillary diameter of 0.25 mm. The cross-section of the resultant pitch fiber was of such a radial structure as shown in FIG. 5(a).

EXAMPLE

Melt spinning was performed in the same way as in the above Comparative Example except that the elongated molded pieces (a)–(f) shown in FIG. 3 were applied in 5 mm depth to the melt-spinning apparatus used therein. The resultant pitch fibers were found to have such cross-sectional structures as shown in FIGS. 5(b) to (g).

What is claimed is:

1. A nozzle for controlling the cross-sectional structure of a pitch fiber produced by melt-spinning a mesophase pitch, said nozzle comprising:
   a capillary defining an elongated capillary channel extending along a predetermined axis for forming said pitch fiber;
   a counterbore orifice of greater cross sectional dimension than that of said capillary channel aligned therewith, said orifice defining a cavity having an inner surface; and
   an elongated molded piece dimensioned so as not to contact said capillary and so as to be centrally received within said cavity with a predetermined spacing between said molded piece and said inner surface, said spacing defining an annular pitch flow path communicating with said capillary channel, said molded piece having a contoured outer surface including a groove or projection thereon, said groove or projection disposed within said counterbore orifice operative to orient the molecular structure of said pitch as it flows thereover to produce a fiber having a random on onion-skin cross-sectional structure.

2. A nozzle as defined in claim 1 wherein said nozzle is disposed within a die plate of predetermined thickness, and said piece extends within said die plate a length equal to at least one third of said thickness.

3. A nozzle as defined in claim 1 wherein said space between said inner surface and said molded piece has a cross-sectional area at least equal to the cross-sectional area of said capillary channel.

4. A nozzle as set forth in claim 1, wherein said elongated molded piece is in the form of a rod having a groove or projection formed on its peripheral surface.

5. A nozzle as set forth in claim 1, wherein said elongated molded piece is formed of a metal.

6. A die plate for melt-spinning a pitch fiber from mesophase pitch having a plurality of nozzles therein, each of said nozzles comprising:
   a capillary defining an elongated capillary channel along a predetermined axis for forming said pitch fiber;
   a counterbore orifice of greater cross sectional dimension that that of said capillary channel aligned therewith, said orifice defining a cavity having an inner surface; and
   an elongated molded piece dimensioned so as not to contact said capillary and so as to be centrally received within said cavity with a predetermined spacing between said molded piece and said inner surface, said spacing defining an annular pitch flow path communicating with said capillary channel, said molded piece having a contoured outer surface including a ridge or groove thereon, said groove or projection disposed within said counterbore orifice operative to orient the molecular structure of said pitch as it flow thereover to produce a fiber having a random or onion-skin cross-sectional structure.

7. A die plate as defined in claim 6 wherein said plate includes a fixing plate associated, therewith, said fixing plate including a plurality of holes positioned in registry with said nozzles, said fixing holes adapted to receive said molded pieces and position said pieces within said counterbore orifices in said dieplate.

* * * * *